Nov. 20, 1951     F. R. McFARLAND     2,575,522
TRANSMISSION
Filed Aug. 14, 1946                        5 Sheets-Sheet 1
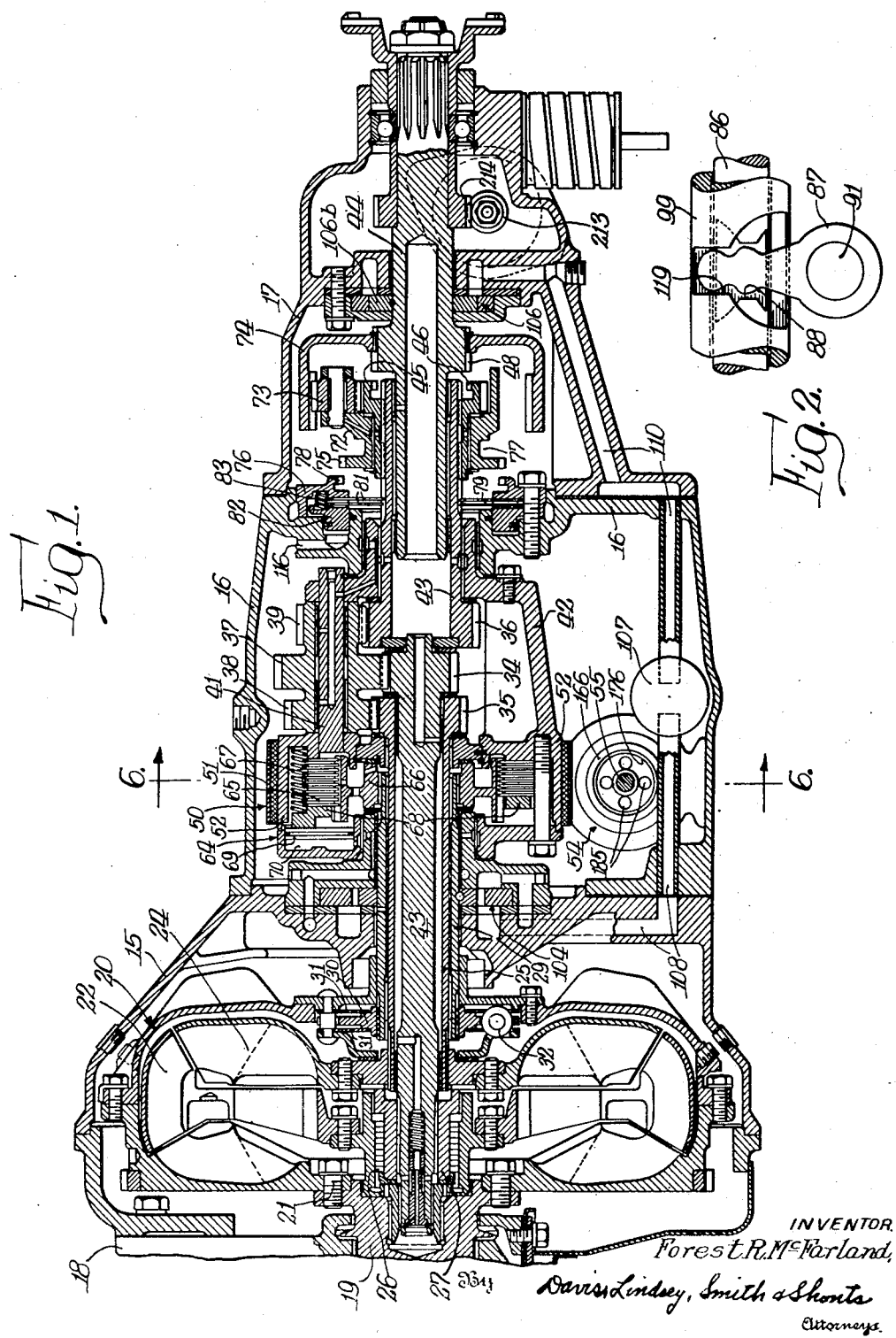
INVENTOR.
Forest R. McFarland,
Davis, Lindsey, Smith & Shonts
Attorneys.

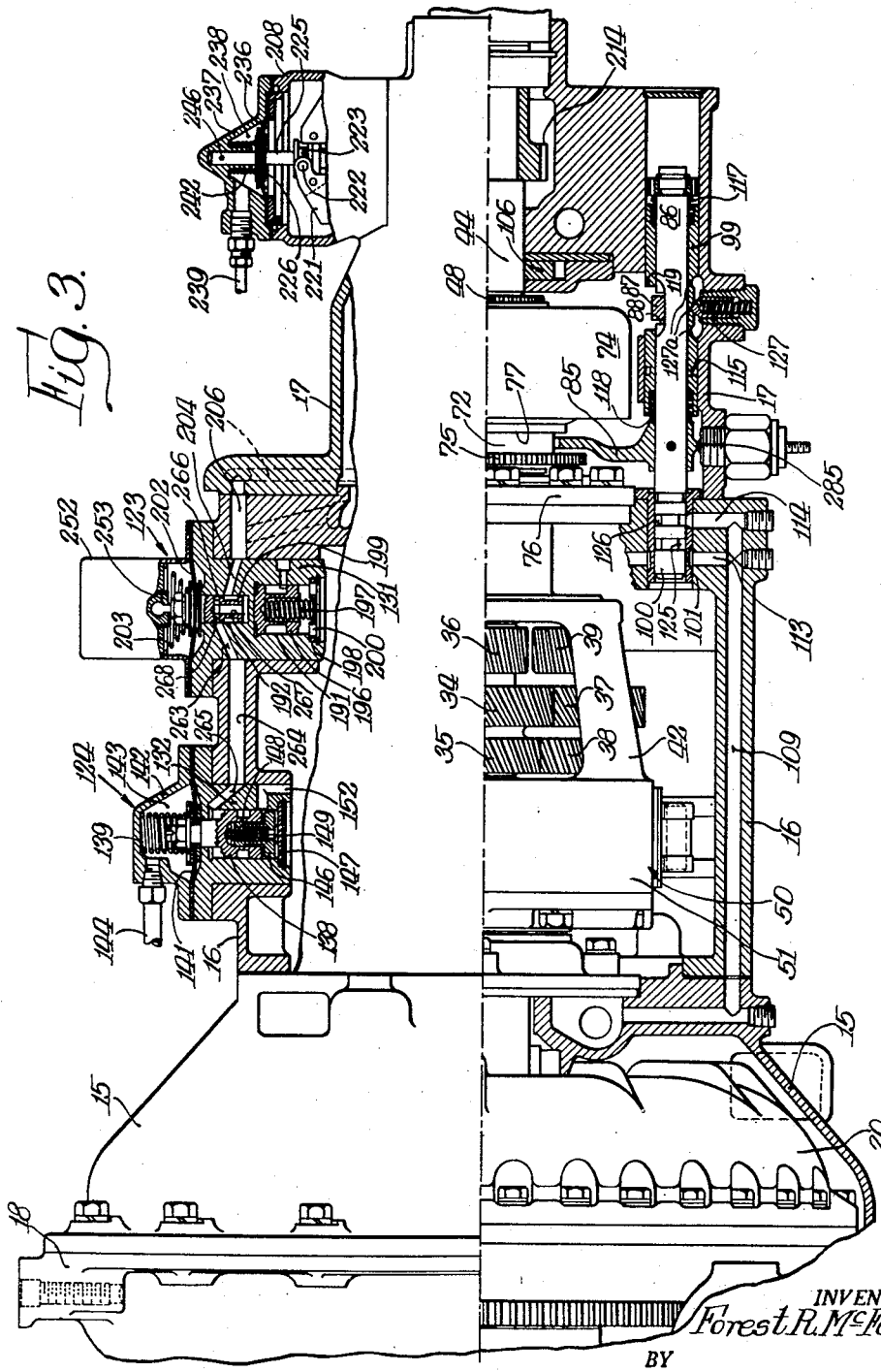

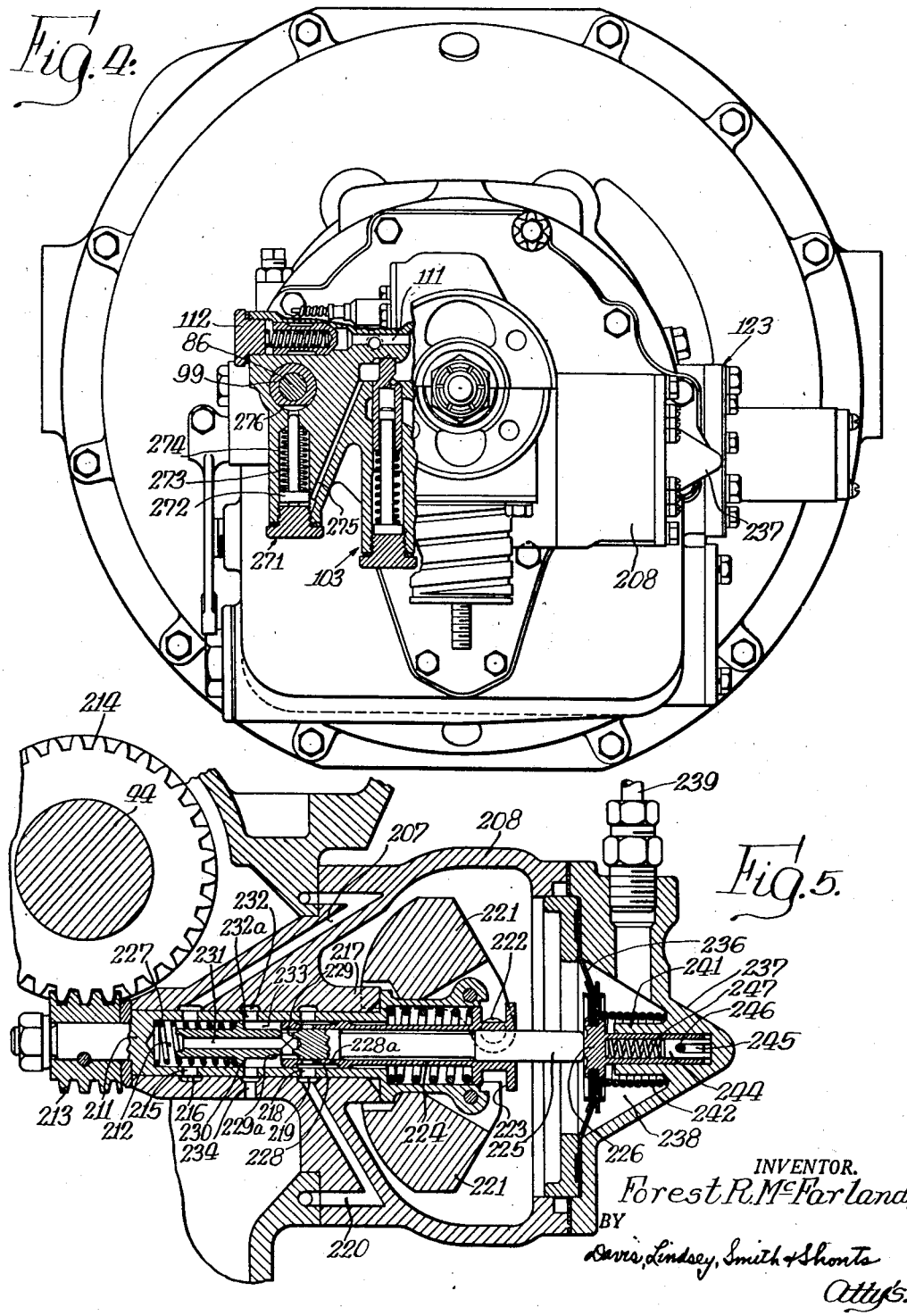

Nov. 20, 1951 F. R. McFARLAND 2,575,522
TRANSMISSION
Filed Aug. 14, 1946 5 Sheets-Sheet 4

INVENTOR.
Forest R. McFarland,
BY
Davis, Lindsey, Smith & Shonts
Attys.

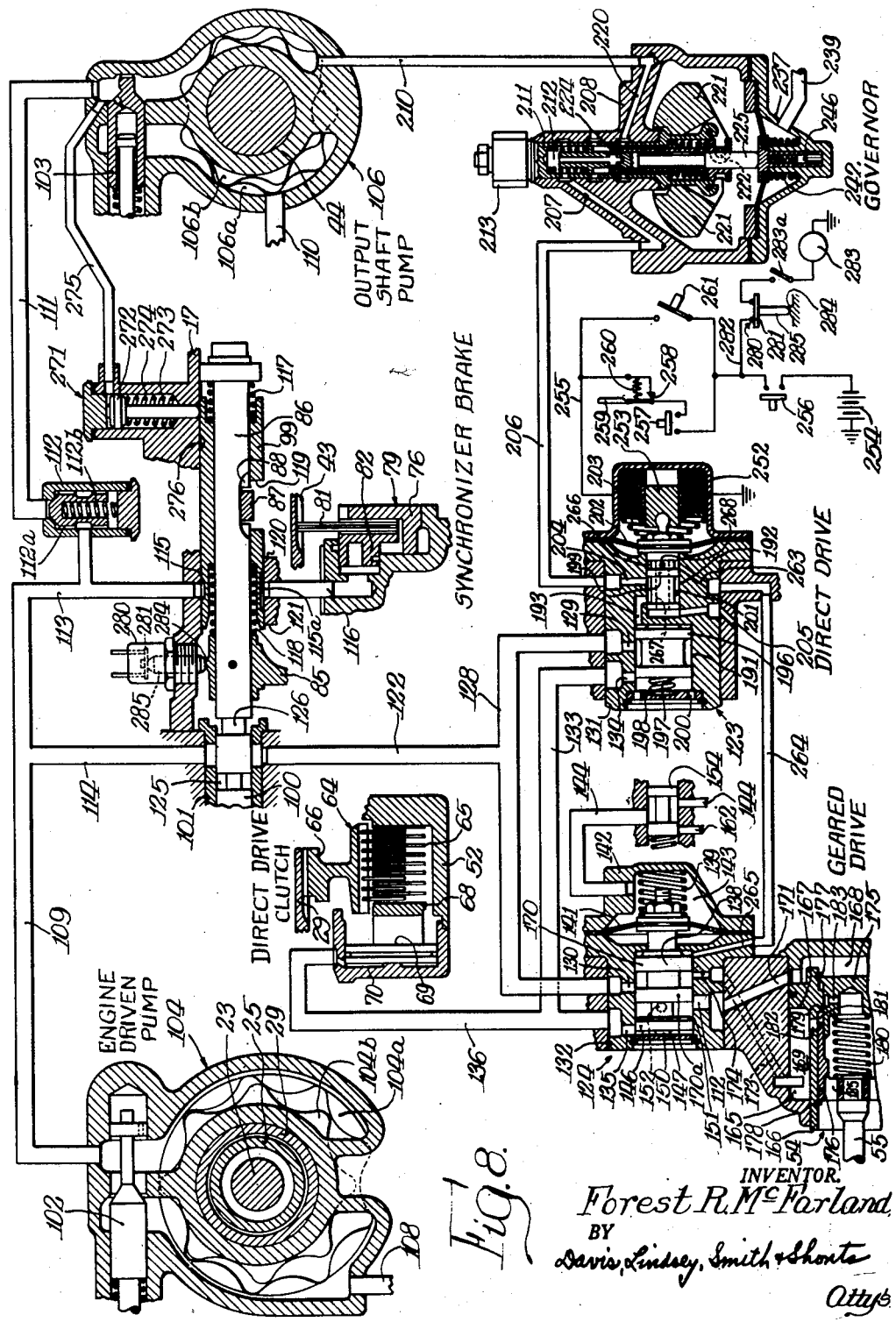

Patented Nov. 20, 1951

2,575,522

UNITED STATES PATENT OFFICE 2,575,522

TRANSMISSION

Forest R. McFarland, Huntington Woods, Mich., assignor to Packard Motor Car Company, Detroit, Mich., a corporation of Michigan Application August 14, 1946, Serial No. 690,517

14 Claims. (Cl. 74—752)

This invention relates to motor vehicle transmissions and control means therefor.

The invention pertains generally to transmissions of the planetary gear type and having a brake device adapted to coact with a reaction member for establishing geared drive and a clutch device adapted to lock the gearing for unitary rotation for establishing direct drive. Shift mechanism, conditioned by the driver, is provided for connecting and disconnecting the driven and the tail shafts for forward or reverse drive or neutral.

An object of the invention is to provide a transmission in which the brake device is not fully released until the clutch device is sufficiently engaged to take up the motor torque upon shift-up from the geared drive to direct drive, while quicker release of the brake device is effected when the driver is maneuvering the vehicle and geared drive is disestablished without establishing direct drive.

Another object of the invention is to provide the transmission with fluid operated means so controlled that the driven shaft is held stationary until after the driven and tail shafts are connected for forward or reverse drive.

Another object of the invention is to provide a pressure fluid system supplied with fluid from pumps driven by the engine and the wheels of the vehicle, and having means disconnecting the wheel driven pump from the engine driven pump when the vehicle is standing still and the engine is running.

Another object of the invention is to automatically lock the shift mechanism against operation while it is in forward position and the vehicle is in motion.

Another object of the invention is to provide improved valve control devices for the brake device and clutch device.

Another object of the invention is to provide a transmission of the character referred to with means for automatically effecting direct drive, a device operated at the will of the driver for overruling such means to effect step-down from direct drive to geared drive, and means, responsive to the speed of the vehicle, for preventing such step-down under the control of said device when the vehicle is traveling above a certain high speed.

Other objects of the invention will appear from the following description taken in connection with the drawings, which form a part of this specification, and in which:

Fig. 1 is a longitudinal sectional view of a transmission embodying the invention;

Fig. 2 is a fragmentary view of the shifter mechanism looking from the inside of the transmission toward the outside;

Fig. 3 is a horizontal sectional view of the transmission with part of the casing shown in full and with the section taken on the central axis of the transmission;

Fig. 4 is a rear end elevation of the transmission with parts broken away to show certain valves and the shifter locking device in vertical section;

Fig. 5 is a horizontal sectional view of the speed and vacuum control device taken substantially on the axis of the device;

Fig. 8 is a diagrammatic and partly sectional view of the control system for the transmission.

Figure 7:
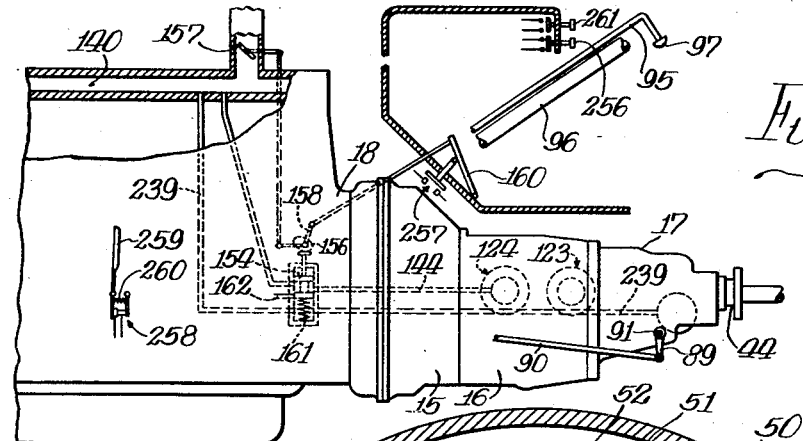
Fig. 7 is an elevational view, largely diagrammatic, of portions of a motor vehicle, showing the general arrangement of some of the control devices of the transmission.

Referring to Figs. 1 and 3 of the drawings, the transmission is housed in a casing comprising sections 15, 13 and 17, the forward section 15 being secured to the rear wall 18 of a conventional internal combustion engine provided with the usual crankshaft 19 (Fig. 1). A fluid coupling is housed in the casing section 15 and comprises an impeller carrying member 20, secured by bolts 21 to the rear end of the crankshaft, a primary runner 22 with its power or drive shaft 23, and a secondary runner 24 splined to a sleeve drive shaft 25 concentric with the shaft 23. A one-way clutch 26 provides a driving connection between the runner 22 and a sleeve 27 splined to the shaft 23. A sleeve shaft 29 telescopes shaft 25 and has a hub 30 splined on its forward end. Fixed to the impeller carrying member are two plate members 31 and coil springs 32 are disposed in recesses in the hub 30 and plates 31 to provide a flexible driving connection between the impeller and sleeve shaft 29.

Change speed gearing, housed within the casing section 16, is preferably of the planetary type and provides a plurality of different gear ratios. The planetary gearing includes drive gear 34 fixed on shaft 23, drive gear 35 fixed to shaft 25, driven gear 36 and planetary gears 37, 38 and 39 meshing with gears 34, 35 and 36 respectively. The planetary gears 37, 38, 39 are rotatably mounted on a pin 41 fixed to a carrier 42, it being understood that there may be more than one of these groups of gears 37, 38 and 39 and their supporting pins 41.

The driven gear 36 is fast to the forward end of sleeve shaft 43. Tail shaft 44 is in axial alignment with the shaft 23 and extends into the sleeve shaft 43. Shift mechanism housed in the casing section 17 is adapted to connect the shafts 43 and 44 for forward or reverse drive. This mechanism includes a sun gear 45 splined on the rear end of the shaft 43. When the sun gear is shifted toward the right, as view in Fig. 1, internal clutch teeth 46 on the sun gear are moved into mesh with splines or teeth 48 on the tail shaft so that the vehicle may be driven forwardly.

When the carrier 42 is not restrained against rotation, it will be driven freely in a direction reverse to that of the shafts 23 and 25 and no drive will be transmitted to the shaft 43. Gears 34, 37, 39 and 36 comprise the low speed reduction gear train and gears 35, 38, 39 and 36 comprise the higher or intermediate speed reduction gear train. When the carrier 42 is held stationary by brake device 50, to be later described, torque will be multiplied through the low speed gears 34 and 37 or the intermediate speed gears 35 and 38, depending upon which of the runners 22, 24 is effective. The primary runner 22 is effective to drive power shaft 23 and the low speed gear train during low speed operation of the fluid coupling, and at some increased speed operation of the coupling secondary runner 24 takes over the drive through the shaft 25 and the intermediate speed gear train, the clutch 26 then permitting overrun of the primary runner. Thus either low or intermediate gear ratio is established automatically when the carrier 42 is restrained from rotation by the brake device 50. Drive through either of the train gears is called "geared drive."

The brake device 50 (Figs. 1 and 6) includes a brake band 51 and a forwardly extending shell 52 on the carrier 42, the shell forming a reaction member against which the brake band is applied to hold the carrier stationary. One end of the brake band 51 is anchored to the casing section 16 and the band is adapted to be engaged with or released from the reaction member 52 by an actuator device 54 through piston rod 55 and lever 56. The brake is applied only when geared drive through the planetary gear is to be established. The brake control means will be described later.

Housed within the shell 52 on the carrier is a friction clutch 64 which, when applied, effects high speed or direct drive through the planetary gearing. The clutch includes clutch plates 65 slidably splined alternately to the shell 52 and to clutch hub 66, which latter is splined to the rear end of the sleeve shaft 29 driven by the shaft 19 and through the impeller carrying member 20. Coil springs 67 normally hold a pressure plate 68 towards the left (Fig. 1) so that the plates 65 are disengaged. The plates are engaged through means of fluid operated pistons 69 slidably mounted in pressure chambers 70.

When the clutch 64 is engaged, the carrier is driven directly by the impeller carrying member 20 thereby imparting rotation to the gear 39 bodily about the axis of the carrier, thus rotating the gear 36, so that power will flow from the carrier through the planetary gears to the sleeve shaft 43. At the same time the fluid coupling speed is such that the primary rotor 22 will be driving shaft 23 and thus impart rotation to the lower speed gear train drive. This two-path drive will cause rotation of the sleeve shaft 43 at substantially the same speed as that of the crankshaft.

Rotatably mounted on the sleeve of the sun gear 45 (Figs. 1 and 3) is a carrier 72 which through suitable pins thereon supports planetary gears 73 meshing with the sun gear 45 and internal teeth on an annular gear 74. The latter, in turn, is splined to the tail shaft 44 through the splines 48. When the carrier 72, with the sun gear 45, is shifted to the left, as viewed in Fig. 1, brake teeth 75 on the carrier are moved into engagement with internal teeth 78 on an abutment ring 76 secured by bolts to the rear wall of the casing section 16. Thus the carrier is held stationary so that the drive from the sun gear 45 to ring gear 74 through planetary gears 73 will rotate the tail shaft 44 at a reduced speed and in a reverse direction relative to that of shaft 43.

When the engine is running and the shift mechanism is in neutral position, a synchronizer brake 79 is effective to hold the shaft 43 stationary and thus prevent clash of teeth 46 with splines 48 or of teeth 75 with teeth 78 when the sun gear and carrier 72 are shifted into forward or reverse drive position. Brake plates 81, positioned within the ring member 76, are splined to the sleeve shaft 43 and are engageable with the member 76 by means of a piston 82 which is fluid actuated against the action of springs 83. With the brake 79 applied, the sleeve shaft 43 is held stationary and hence there is no rotation of teeth 46 or 75 while being shifted into engagement with splines 48 or teeth 78, respectively, to effect forward or reverse drive.

The carrier 72 and sun gear 45 are shifted into forward or reverse position through a fork 85 (Fig. 3), the arms of which engage in a groove 77 in the carrier 72. The fork 85 is fast on shift rail 86, having a slot 88 (Figs. 2 and 3) into which extends an arm 87 fixed on shaft 91 (Fig. 7). An arm 89 external of the casing 17 (Fig. 7) fast on shaft 91 is connected by a link 90 and other suitable connections (not shown) to the lower end of a rod 95 which is arranged adjacent the steering wheel column 96 and has a handle 97 for operation by the driver. The shift rail 86 is mounted in a valve and actuator sleeve 99 (Fig. 3) axially movable in a bore in casing section 17 and the left hand or valve end 100 of the rail is axially movable in sleeve 101 fixed in casing section 16.

The synchronizer brake 79, the reaction or geared drive brake 50 and the direct drive clutch 64 are controlled by a fluid system which has a plurality of valve control devices, the system being shown diagrammatically in Fig. 8. A pump 104 of conventional design (Figs. 1 and 8) has a stationary gear 104ª and a movable gear 104ᵇ the latter being driven from the sleeve shaft 29 of the impeller 20. A like pump 106 has its movable gear 106ᵇ driven from the tail shaft 44. These two pumps circulate the fluid through the system under sufficient pressure to operate the synchronizer brake 79, reaction brake 50 and direct drive clutch 64. The pumps 104 and 106 draw fluid from the bottom of the casing section 16 through a common screen 107 and passages 108 and 110, respectively. The pump 104 delivers fluid to main delivery passage 109 and pump 106 to delivery passage 111. Suitable relief valves 102 and 103 (Figs. 4 and 8) are associated with the outlets of the pumps 104 and 106, respectively, to limit the pressure in the delivery passages. A check valve 112 is interposed between passage 111 and a branch passage 113 leading from the main delivery passage 109. Valve 112 is fluted as at 112a so that fluid from passage 113 may bleed to the ends of the valve. When the car is standing still, at which time there is no pressure in the passage 111, the valve 112 is held closed initially by a spring and by fluid pressure in branch passage 113, so that the pump 106 is shut off from the fluid pressure created in the passage 109 by pump 104 and there is no leakage through pump 106. When the car is in motion, however, the pressure of the pump 106 will hold the valve 112 open to connect the delivery passages of the two pumps, if the pressure of pump 106 is greater than that of pump 104 by amount equal to the pressure of spring 119b.

The valve and actuator sleeve 99 has a peripheral groove 115 (Fig. 8), a narrow portion of which is adapted to register with the branch 113 and a wider or elongated portion 115ª of which is adapted to register with passage 116 leading to the synchronizer brake device 79. A coil spring 117 is compressed between one end of the sleeve 99 and a collar on the adjacent end of the shaft rail 86 and a coil spring 118 is compressed between the opposite end of the sleeve and the hub of the arm 85. With the shift mechanism in neutral position, as shown in Fig. 8, the valve sleeve 99 is held in its central position by the springs which are balanced, and the groove 115 is in registry with passages 113 and 116, so that pressure fluid causes engagement of the synchronizer brake which then holds the sleeve shaft 43 against rotation.

The end of the shifter arm 87 extends into the upper portion of a slot 119 (Fig. 2) in the valve sleeve 99 and as this portion of the slot is narrower than the central portion of the slot 88 in the shift rail 86, when the arm 87 is rocked fore or aft by the operator the sleeve valve will be shifted ahead of the rail. Upon such movement, the narrow portion of the groove 115 is shifted out of registry with the passage 113 to shut off fluid flow to the synchronizer brake and the wider portion 115ª of the groove is shifted to vent the passage 116 to the case 17 at 120 or 121, depending upon the direction of the shift, thus permitting release of the synchronizer brake. When the sleeve valve 99 is shifted to the right or left from neutral position (Fig. 8) either spring 117 or 118 will be compressed to shift rail 86 to engage the forward or reverse clutch or brake teeth (45 and 48 or 75 and 78) just prior to the venting of the synchronizer brake. In the event the clutch or brake teeth abut when the shift is made, the compressed spring will complete the shift upon slight rotation of the released shaft 43, so that engagement of the clutch or brake teeth will be accomplished without clash.

A spring pressed detent 127 (Fig. 3) is adapted to engage lightly in notches 127ª formed in the outer side of the valve sleeve 99 to retain the shift mechanism in neutral, forward or reverse.

The shift rail 86 also serves as a primary valve for controlling flow in the fluid system through branch passage 114 and passage 122 (Fig. 8) to direct drive valve control device 123 and geared drive valve control device 124. Sleeve 101, supporting the valve end of rail 86, is provided with ports aligned with passages 114 and 122. The rail is provided with passages or grooves 125 and 126 adapted to register with the ports in the sleeve 101 when the shift rail 86 is in forward or reverse position. Thus when the rail is in neutral position, the fluid system is shut off from the valve devices 123 and 124 but the system is open to these devices when the rail is in forward or reverse position.

Passage 122 connects with passage 128, which leads to port 129 in valve sleeve 131 of control device 123 and to port 130 (Figs. 6 and 8) in valve sleeve 132 of control device 124. Passage 133 connects port 134 in the valve sleeve 131 with a port 135 in the valve sleeve 132.

The valve device 124 controls operation of the geared drive brake 50. Within the sleeve 132 is a valve member 138 which is under the control of a spring 139 (Figs. 3, 6 and 8) and pressure in the engine fuel intake manifold 140 (Fig. 7). A diaphragm 141 is clamped between the sleeve 132 and a cap 142 which houses the spring and provides a chamber 143 adapted to be connected by a conduit 144 to the intake manifold 140. The valve member 138 is connected to the diaphragm and the spring 139 normally urges the valve member towards the left, as viewed in Fig. 8, to open position. Associated with the valve member 138 is a second valve member 146 positioned between the valve member 138 and a fixed disk 147 which closes one end of the valve sleeve 132. The member 146 (Fig. 6) has a hollow cylinder portion 148 fitting in a bore in the valve member 138 and a coil spring 149, located within the portion 148 and the bore tends to hold the member 146 with its projections 150 in engagement with disk 147.

Figure 6:
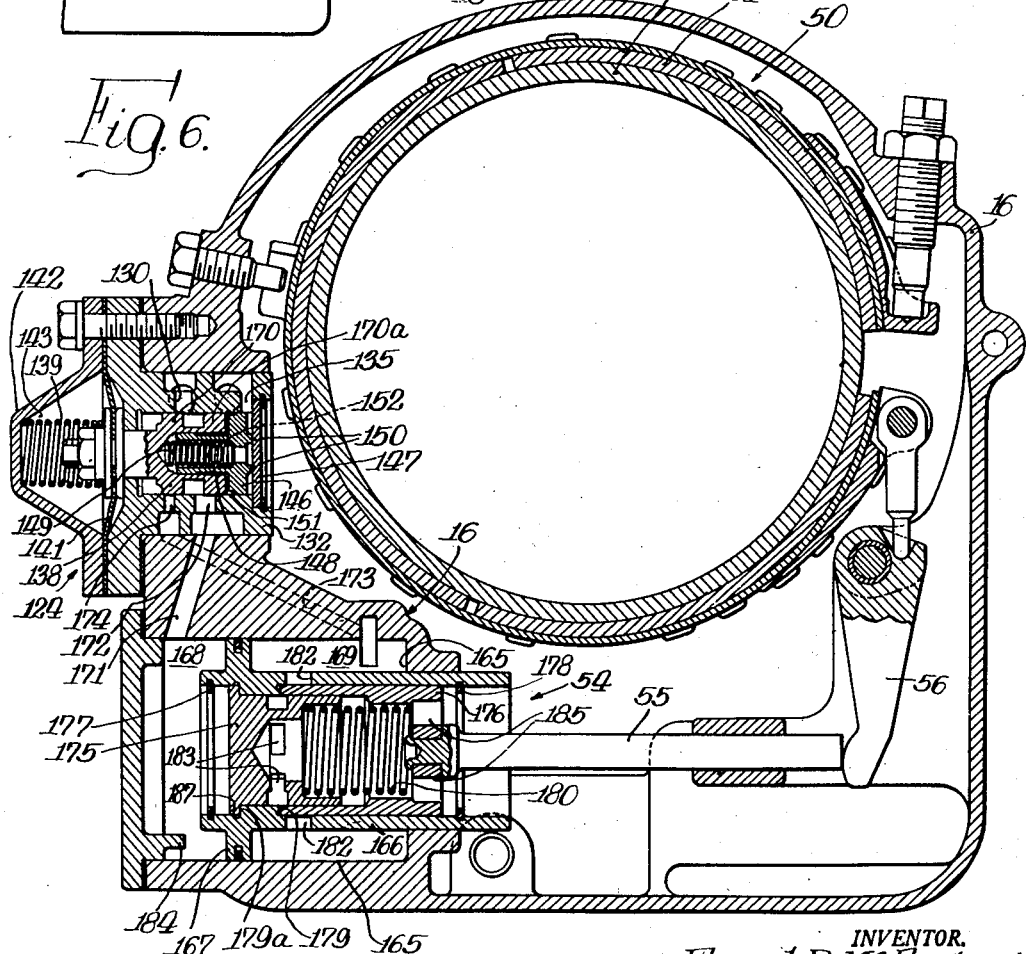
Fig. 6 is a transverse sectional view of the geared drive control devices taken substantially on line 6—6 of Fig. 1.

When the engine is idling, the chamber 143 is open to the sub-atmospheric manifold pressure in the manifold 140 through a valve 154 (Figs. 7 and 8) in the conduit 144 and such pressure is sufficient to overcome the spring 139 and cause the valve member 138 to move to the position wherein it closes a passage leading to the brake operating mechanism (to be hereinafter described), as shown in Fig. 8 which illustrates the system in neutral position with the engine idling. The throttle 157 is operated through connections, including lever 158 (Fig. 7) by the accelerator pedal 160. Upon depression of the latter, cam 156, which is moved with the lever 158, shifts the valve 154 against the action of its spring 161 to close the connection with the manifold and vent chamber 143 to atmosphere through vent 162. Thus, with the engine idling and the vehicle standing still, the brake control valve 124 is ineffective to hold the planetary gear carrier 42, but when the shift rail 86 is first moved to forward or reverse position and the accelerator is then depressed, the valve 154 is closed and the chamber 143 vented to the atmosphere, whereupon the spring 139 shifts the valve member 138 from the position shown in Fig. 8 toward the right to the position wherein it opens the aforesaid passage leading to the brake operating mechanism, in which condition it is illustrated in Fig. 6.

Associated with the valve device 124 is the compound piston and valve device 54 (Figs. 6 and 8) forming part of the means for actuating the brake 50. Mounted in cylinder 165, formed in the casing section 16, is a sleeve piston 166 having a flange 167 sealing off chamber 168 in the end of the cylinder 165 from chamber 169 around the sleeve portion of the piston 166. The chamber 168 is connected by passage 171 with a port 172 in the valve sleeve 132 and chamber 169 is connected by passage 173 to a port 174 in the same sleeve. The valve member 138 has flanges 170 and 170ª so that either passage 171 or 173, depending upon the position of the valve member, may be connected with the port 130 and passage 128. With the engine idling and the vehicle standing still, the valve member 138 is in its right-hand position, as shown in Fig. 8, passage 128 through port 130 then being open to passage 173 and closed to passage 171. Piston member 176, connected to the brake operating rod 55, is slidably mounted in the sleeve piston 166. A valve 175 is mounted for slidable movement in the right-hand end (Fig. 8) of the sleeve piston 166 and the piston member 176. A spring 180 normally holds the valve 175 against a stop ring 177 and the piston member 176 against a stop ring 178, these stop rings being carried by the sleeve piston 166. With the parts in such condition, the left-hand end (Fig. 8) of the piston member 176 is spaced from an interior flange 179 on the sleeve piston 166 and space 181, between the flange 179 and the adjacent end of the piston member 176, is open to ports 182 in the piston 166. At the same time radial ports 183 in the valve 175 are out of communication with the space 181, and the flange 167 on the sleeve piston 166 engages a projection 184 (Fig. 6) on the case so that the chamber 168 is always in communication with the passage 171. The piston member 176 has vent openings 185 in its end which is fixed to the rod 55.

When the shift rail 86 is in forward or reverse position and the engine is idling, the valve 138 is in the position shown in Fig. 8, and fluid pressure is supplied from the pump 104 through passages 109 and 128 and the valve 138 to the chamber 169, which at such time has no outlet as the space 181 and ports 182 are closed by the valve 175. When the accelerator is depressed, the valve 154 is operated to close the chamber 143 to the intake manifold 140 and open it to the atmosphere, whereupon the spring 139 moves the valve 138 to its open position as above explained and as shown in Fig. 6. Thereupon the flange 170 of the valve closes the port 174 and the passage 130 is opened to the passage 171 and the fluid pressure causes fluid to flow into the chamber 168 to move the compound piston and valve device (166, 176, 175) to the right to apply the geared drive brake 50, as shown in Fig. 6.

As the pressure fluid in chamber 169 is trapped by the closing of the port 174, this fluid first opposes movement of the sleeve piston 166 to the right (Fig. 6) and the fluid flowing through the port 171 into the chamber 168 first moves the valve 175 against the action of the spring 180 until flange 187 on the valve strikes the interior flange 179a on the sleeve piston 166. This movement of the valve relative to the sleeve piston brings the ports 183 in the valve into registry with the ports 182 permitting venting of the chamber 169 through these ports and the relief ports 185 in the piston member 176. Thereupon the pressure in the chamber 168 moves the sleeve piston 166 and the valve 175 rapidly toward the right and this movement through the spring 180, piston member 176 and operating connections to the brake causes initial but light engagement of the brake band 51 with the reaction shell 52. The reaction of the engaged band is transmitted back through the connections to the piston member 176 so that further movement of the piston 166 toward the right (Fig. 6) relative to the member 176 progressively reduces the escape area of the ports 182 resulting in slowing up of the travel of the piston 166. Near the end of this travel, the flange 179 abuts against the left-hand end of the piston member 176 so that the piston sleeve 166 acts positively on the piston member and the band brake is fully and firmly engaged with the shell 52. Thus the arrangement is such that the brake is operated in two stages. The initial light engagement is rapid and the final firm engagement is effected at a reduced speed, thus avoiding harshness and noise.

With the geared drive brake 50 applied, the lower speed or intermediate speed is established, as above described. When shift-up to direct drive is established, which occurs approximately at a vehicle speed of fifteen miles per hour, for small throttle opening, the geared drive brake is released and the direct drive clutch 64 is actuated. To this end the valve device 123 is operated under the combined influence of the vehicle speed and sub-atmospheric pressure in the intake manifold. The valve device 123 and its control means will be described later. It will suffice for the present to state that, upon shift-up from geared drive to direct drive, ports 129 and 134 in the valve sleeve 131 are placed in communication with each other resulting in fluid pressure flowing from passages 122 and 128, through ports 129 and 134 and passages 133 and 136 to the chambers 70 resulting in operation of the clutch 64. The fluid also flows from the passage 133 through port 135 into the left-hand end (Fig. 8) of the chamber in the valve sleeve 132 and the pressure moves the valve members 138 and 146 to the right as a unit against the action of the springs 139 and 149. The port 130 is then closed to passage 171 but open to passage 173 so that fluid flows into the chamber 169, thus forcing the piston sleeve 166 and associated parts to the right to release the brake 50. With the valve members 138 and 146 in their right-hand position, groove 151, formed in the periphery of the flange of member 146, is in registry with vent openings 152 (Figs. 3 and 8) so that the oil under pressure in the chamber 168 is vented into the case. As the groove 151 is restricted in size, however, the fluid in the chamber 168, while being vented, is under some pressure so that there is gradual release of the brake and at no time is the brake fully released before the clutch 64 is sufficiently engaged to take over the motor torque. Thus racing of the motor is avoided during the change from geared drive to direct drive. At the same time the brake releases sufficiently fast so that the clutch 64 is not fully engaged while the brake band is unduly restraining rotation of the carrier 42. This action is also improved by the fact that the capacity of the brake to act as an abutting member for the gear drive reaction is approximately twice that of a brake member attempting to delay the action to the clutch. The difference in braking capacity is brought about by the fact that the brake is slipping during engagement of the clutch and the torque of the clutch is in opposition to the torque produced by the brake. Due to the respective torques involved, this action is still of sufficient capacity to handle geared drive when the motor is used as a brake, as when the vehicle is going down a steep grade.

The valve sleeve 131 (Figs. 3 and 8) of the control device 123 has two valve chambers 191 and 192 connected at their adjacent ends by passage 193 formed in the sleeve. Associated with the chamber 191 are the previously mentioned ports 129 and 134 communicating with passages 128 and 133, respectively. Valve 196 in the chamber 191 is normally held in its right-hand position, as shown in Fig. 8, by spring 197 compressed between the closed end of a bore in the valve and a fixed plate 198 having vents 200. With the valve in such position, the passage 133 is open to the vents 200.

Positioned in the valve chamber 192 is the valve 199 having a wide groove 201. The valve is attached to a diaphragm 202 and a spring 203 normally holds the valve in its left-hand position as shown in Fig. 8 with the wide groove 201 placing port 204 in communication with the passage 193. A vent port 205 leads from the left-hand end of the chamber 192 to the atmosphere. The port 204 is connected by a conduit 206 to a passage 207 in the casing 208 of the control device (Figs. 3, 5 and 8) which is operated under the influence of the vehicle speed and sub-atmospheric pressure in the engine intake manifold. This control device is for the main part the subject matter of my copending application Serial No. 644,850 filed February 1, 1946.

A passage 210 (Fig. 8) leads from the pump 106 to a passage 220 in the casing 208. Valve member 211 (Figs. 5 and 8), having a cylindrical valve chamber 212, is rotated through gears 213 and 214 fast on the projecting shank of the member 211 and on the tail shaft, respectively. The member 211 has ports 215 registering with groove 216 in standard 217, in which the member 211 is mounted. The member 211 also has ports 218 registering with groove 219 in the standard, and the passage 220 leads to this groove. Pivoted on the outer end of the member 211 are fly weights 221 having arms carrying pins 222 extending into a groove 223 on a valve sleeve 224 slidable in member 211. Slidable in the sleeve 224 is another valve member 225, the outer end of which is held in engagement with plunger 226 by spring 227 compressed between the inner end of the chamber 212 and a flange 230 on the member 225. The valve sleeve 224 has radial ports 228 and groove 228ª adapted to register with the ports 218 and groove 219 and the member 225 has radial holes 229 and a grooved port 229ª adapted to register with ports 228. Holes 229 connect with an axial passage 231 in the member 225. There is a groove 232 in the bore of the standard 217 and this groove, through holes 232ª in the member 211, remains in communication with a space 233 between the members 211 and 225, and a vent port 234 opens the groove 232 to the atmosphere.

Plunger 226 is carried by a diaphragm 236 which is secured to the casing 208 by a cap 237. The chamber 238 within the cap is connected by a conduit 239 to the engine intake manifold 140 (Fig. 7). The shank of the plunger (Fig. 5) is slidable in a boss 241 on the cap 237 and a spring 242 around the boss 243 tends to move the plunger inwardly in opposition to spring 227. A spacer member 244, slidably mounted in the bore of the plunger shank, has a slot 245 fitting over a pin 246 carried by the shank. Except when there is fluid pressure acting on the valve member 225 to move the latter outwardly to its extreme position, spring 247, acting on the spacer member 244, always maintains the end of the slot against the pin 246 so that the outer end of the member 244 is in its fully projected position, as shown in Fig. 5. This is true even when lowest sub-atmospheric pressure exists in chamber 238, at which time the outer end of the member 244 abuts the bottom of the boss 241 and the outer end of the plunger shank is held out of contact with the boss bottom.

The speed and vacuum control device is so arranged that as the weights 221 move out in response to increased vehicle speed they move the valve sleeve 224 inwardly (to the left as viewed in Fig. 5) and as the sub-atmospheric pressure in the intake manifold and thus in the chamber 238 increases due to the increased speed of the engine relative to the position of the accelerator pedal 160, the valve member 225 also moves to the right as viewed in Fig. 5. With the transmission in geared drive and the vehicle speed below the governed speed, which is about fifteen miles per hour, the ports 218 are closed to the ports 229 and there is no fluid flow from the pump 106 to the passage 206. These ports, however, may be placed into communication with each other at any speed above the governed speed depending upon the pressure in the chamber 238. Thus the valve member 225 selects the speed, above the governed speed, at which this occurs, so that the valve member 196 is moved to effect operation of the direct drive clutch 64 and release the geared drive brake 50, as already described, up shift from geared drive to direct drive being thereby accomplished. Before the up shift is effected, the inner end of the valve member 224 does not cover the groove 229ª so that the passages 206 and 207 are open to the vent 234 through the passage means in the valve member 225. When the ports 218 and 229ª are brought into register, the inner end of the valve member 224 closes the ports 229ª from the vent 234 and the pressure fluid passing through port 229ª and passage 231 acts against flange 230 on the valve member 225 to move the latter and the plunger 226 to their extreme outer position, at which time the outer end of the plunger shank is moved into engagement with the bottom of the boss 241. As the valve member 225 is thus moved to its extreme outer position, beyond that shown in Figs. 5 and 8, the sleeve valve 224 has to move to a position below its governed speed position before the pressure fluid through the device is cut off and the inner end of the sleeve valve 224 opens the vent 234 to the passage means in the valve member 225. Thereupon pressure on the end of the valve member 196 is relieved, the valve moves to the right (Fig. 8) and the direct drive clutch 64 is released and at the same time valve members 138 and 146 move to the left, due to loss of pressure to the left of member 146, the geared drive brake 50 being applied to again establish geared drive.

Means are provided for overruling the action of the governor device, when effective to establish direct drive, in order that geared drive may be established at the will of the driver. One means of obtaining this overruling consists of solenoid 252 (Figs. 3 and 8), associated with the direct drive control device 123, and energized under the control of the accelerator pedal 160 (Fig. 7). The armature member 253 of the solenoid is connected to the valve 199. Battery 254 is connected with line 255 to the solenoid and interposed in the line is the usual switch 256 for the engine ignition system, a switch 257 operated by the accelerator pedal, and a wind switch 258 which is normally closed. The switch 257 may comprise stationary contacts and a contact movable by the accelerator pedal. The switch 257 is only closed while the accelerator pedal is in overdrive position, that is, beyond its wide open throttle position. Thus, upon pressing the accelerator down to this latter position, the circuit to the solenoid is established whereupon the valve 199 is moved to the right (Fig. 8) to closed postion, even through the intake manifold pressure and centrifugal force dictate that the valve should be in open position. With the valve 199 closed, port 193 is shut off from the pressure fluid in the conduit 206 leading from the speed and vacuum control device and the left-hand end of the valve chamber 192 is vented through the passage 205 to the atmosphere. The spring 197 moves the valve member 196 to the right breaking the communication between the ports 129 and 134 and thereby cutting off fluid pressure through the passage 133 to the direct drive clutch 64 and to the chamber at the left of the valve member 146. At the same time the pressure in the passage 133 and this chamber is relieved through the vent ports 200. Thereupon the clutch is released and the valve members 138 and 146 are shifted to the left so that the brake 50 is applied, thus effecting shift down to geared drive.

The wind switch 258 is provided to prevent shift down from direct drive to geared drive when the vehicle is traveling at high speed, say above fifty miles per hour, and the accelerator pedal is depressed to its overdrive position. If the shift down were effected at higher speeds, the brake band 51, when applied to the reaction member 52 probably would be unduly worn. This switch may comprise two contacts, one of which is connected to a paddle 259 positioned in the air stream of the cooling fan (not shown) of the engine, the contacts being held in normal engagement by a spring 260, and the paddle being operated by the air pressure to open the switch when the vehicle speed reaches approximately fifty miles per hour.

A manually operated switch 261 (Figs. 7 and 8) on the vehicle instrument board is also provided as another means by which the driver may shift down at will from direct drive to geared drive. The switch 261 is in parallel with the switches 257 and 258, and in series with the ignition switch 256 so that when switch 261 is closed by the driver the solenoid is actuated and the shift down is accomplished the same as when the accelerator switch 257 is closed with the wind switch 258 in closed condition. When the switch 261 is closed the shift down will be accomplished even though the vehicle speed is over fifty miles per hour.

With the valve 199 closed by the solenoid by operation of either switch 257 or 261 and the transmission in geared drive, if the throttle valve were fully closed, as when coasting downhill, the valve 154 would open the chamber 143 of the valve device 124 to the intake manifold and the low pressure in the chamber would overcome the spring 139 and move valve member 138 to the right (Fig. 8). This would result in release of the geared drive brake, which of course would be objectionable. Provision is therefore made to prevent shifting of the valve 138 to the right under such conditions. To this end, the valve 199, when moved to the right by the solenoid 252, carries its wide groove 201 into register with port 263 so that pressure fluid flows from the passage 206 through port 204, groove 201, port 263, conduit 264 and port 265 to the right-hand end of the chamber for valve member 138. The pressure thus exerted on the valve 138 holds it to the left regardless of throttle position.

The valve 199 (Figs. 3 and 8) has a narrow groove 266 connected with bore 267 in the valve by a hole 268. Upon opening of the switch 257 or 261 by the operator, the solenoid is deenergized and the spring 203 moves the valve 199 back to the left and in this position the groove 266 is in registry with the port 263, so that the pressure fluid in the conduit 264 and in the right-hand end of the chamber for the valve 138 is relieved through the valve 199 and the vent 205, so that the vacuum in the chamber 143 will move the valve member 138 to the right if the throttle 157 (Fig. 7) is closed.

A lock 271 (Figs. 4 and 8) is provided to prevent shifting of the transmission to neutral or reverse while the vehicle is moving and the shift mechanism is in forward position. A piston 272 and its spring 273 are mounted in a chamber 274 in the case 17 and under the shift rod 86 and sleeve 99. The outer end of the chamber 274 is connected by a passage 275 to the outlet side of the rear pump 106. When the shift mechanism is moved to forward position with the engine idling and the vehicle stationary, a notch 276 in the shift sleeve 99 is moved opposite the end of the shank of the piston 272. At such time the valve 112 is closed, there being no fluid pressure in the passage 275. Upon operation of the accelerator and movement of the vehicle, fluid flows from the passage 275 into the outer end of the chamber and moves the piston inward against the pressure of the spring 273, the end of the piston shank then engaging in the notch 276 and locking the shifting mechanism in forward position until the vehicle is brought to a stop, whereupon the shift mechanism may be moved to neutral or reverse position, if desired.

Means are also provided to prevent the driver from starting the engine except when the shift mechanism is in neutral position. To this end a switch 280 (Figs. 3 and 8), comprising stationary contacts and a movable contact 281, is positioned in the line 282 to engine starting motor 283, and starting motor switch 283ª, and the switch 280 is closed only when the shift mechanism is in neutral by a projection 284 on the shift fork 85 engaging a plunger 285 carrying the contact 281.

It will be understood that various forms of the invention other than those described above may be used without departing from the spirit or scope of the invention.

Certain subject-matter disclosed in this application, such as the specific means for operating brake device 50, is disclosed and claimed in Forest R. McFarland application Serial Number 659,774, filed April 5, 1946, for Transmission.

I claim:

1. In a transmission for motor vehicles, change speed mechanism, pressure fluid operated means for controlling operation of said mechanism for different ratio drives, a fluid pressure system adapted to operate said means, and including pump means, driver operated shift mechanism for controlling operation of the transmission for forward or reverse drive or neutral, means operated by the fluid pressure for locking the shift mechanism against operation while the latter is in forward position and the vehicle is in motion, and a valve preventing operation of said locking means when the shift mechanism is in forward position, the engine is idling and the vehicle is standing still.

2. In a transmission for motor vehicles driven by an engine and having a fuel intake manifold, a power shaft, a driven shaft, planetary gearing including a carrier adapted to drivingly connect the shafts, a brake device for the carrier, a clutch device for locking the gearing for unitary rotation, a pressure fluid system, a valve device in the system responsive to the pressure in the intake manifold for controlling operation of the brake device, a second valve device for controlling operation of said clutch device and the brake device, and compound valve means in the fluid system responsive to engine speed and the pressure in the intake manifold and having a fluid passage connected to said second valve device whereby the fluid flowing through said compound valve means and passage into said second valve device actuates the latter to cause engagement of the clutch device and release of the brake device.

3. In a transmission for motor vehicles driven by an engine and having a fuel intake manifold, a power shaft, a driven shaft, planetary gearing including a carrier adapted to drivingly connect the shafts, a brake device for the carrier, a clutch device for locking the gearing for unitary rotation, a pressure fluid system, a valve device in the system responsive to the pressure in the intake manifold for controlling operation of the brake device, a second valve device for controlling operation of said clutch device and the brake device and comprising two valve chambers, a port connecting the two chambers, a valve member in one of said chambers adapted to open and close said port, and a second valve member movable in the other chamber and adapted to connect said clutch device and first-mentioned valve device to fluid flow, and compound valve means responsive to engine speed and the pressure in the intake manifold and having a fluid passage connected to the chamber having said first-mentioned valve member whereby the fluid flowing through said compound valve means and passage means into such chamber operates said second valve member to cause engagement of the clutch device and release of the brake device.

4. In a transmission for motor vehicles driven by an engine and having a fuel intake manifold, a power shaft, a driven shaft, planetary gearing including a carrier adapted to drivingly connect the shafts, a brake device for the carrier, a clutch device for locking the gearing for unitary rotation, a pressure fluid system, a valve device in the system responsive to the pressure in the intake manifold for controlling operation of the brake device, a second valve device for controlling operation of said clutch device and the brake device, compound valve means in the fluid system responsive to engine speed and the pressure in the intake manifold and having a fluid passage connected to said second valve device whereby the fluid flowing through said compound valve means and passage into said second valve device actuates the latter to cause engagement of the clutch device and release of the brake device, and means operable at the will of the driver for effecting operation of said second valve device to cause release of the clutch device and engagement of the brake device and thus overrule the compound valve means.

5. In a transmission for motor vehicles driven by an engine and having a fuel intake manifold, a power shaft, a driven shaft, planetary gearing including a carrier adapted to drivingly connect the shafts, a brake device for the carrier, a clutch device for locking the gearing for unitary rotation, a pressure fluid system, a valve device in the system responsive to the pressure in the intake manifold for controlling operation of the brake device, a second valve device for controlling operation of said clutch device and the brake device, a solenoid associated with said second valve device, compound valve means in the system responsive to engine speed and the pressure in the intake manifold and having a fluid passage connected to said second valve device whereby the fluid flowing through said compound valve means and passage into said second valve device actuates the latter to cause engagement of the clutch device and release of the brake device, and switch means operable at will by the driver for energizing said solenoid to overrule said compound valve means and effect release of the clutch device and engagement of the brake device.

6. In a transmission for motor vehicles driven by an engine and having a fuel intake manifold, a power shaft, a driven shaft, planetary gearing including a carrier adapted to drivingly connect the shafts, a brake device for the carrier, a clutch device for locking the gearing for unitary rotation, a pressure fluid system, a valve device in the system responsive to the pressure in the intake manifold for controlling operation of the brake device, a second valve device for controlling operation of said clutch device and the brake device and comprising two valve chambers, a port connecting the two chambers, a valve member in one of said chambers adapted to open and close said port, and a second valve member movable in the other chamber and adapted to connect said clutch device and first-mentioned valve device to fluid flow, compound valve means responsive to engine speed and the pressure in the intake manifold and having a fluid passage connected to the chamber having said first-mentioned valve member whereby the fluid flowing through said compound valve means and passage means into such chamber operates said second valve member to cause engagement of the clutch device and release of the brake device, a solenoid connected to said first-mentioned valve member of said second valve device, and switch means operable at will by the driver for energizing said solenoid to cause said first-mentioned valve member to close said port, thus overruling said compound valve means and effecting release of the clutch device and engagement of the brake device.

7. In a transmission for motor vehicles driven by an engine and having a fuel intake manifold, a power shaft, a driven shaft, planetary gearing including a carrier adapted to drivingly connect the shafts, a brake device for the carrier, a clutch device for locking the gearing for unitary rotation, a pressure fluid system, a valve device in the system responsive to the pressure in the intake manifold for controlling operation of the brake device, a second valve device for controlling operation of said clutch device, automatic means responsive to the engine speed and the pressure in the intake manifold for controlling said second valve device, a device operable at the will of the operator for overruling said automatic means, and means for preventing operation of said first valve device under the influence of the pressure in the intake manifold while said automatic means remains overruled.

8. In a transmission for motor vehicles driven by an engine and having a fuel intake manifold, a power shaft, a driven shaft, planetary gearing including a carrier adapted to drivingly connect the shafts, a brake device for the carrier, a clutch device for locking the gearing for unitary rotation, a pressure fluid system, a valve device in the system responsive to the pressure in the intake manifold for controlling operation of the brake device, a second valve device for controlling operation of said clutch device and the brake device, a solenoid associated with said second valve device, compound valve means in the system responsive to engine speed and the pressure in the intake manifold for controlling operation of said second valve device to cause engagement of the clutch device and release of the brake device, switch means operable at will by the driver for energizing said solenoid to overrule said compound valve means and effect release of the clutch device and engagement of the brake device, and means for preventing operation of said first valve device under the influence of the pressure in the intake manifold while said compound valve means remains overruled.

9. In a transmission for motor vehicles driven by an engine and having a fuel intake manifold, a power shaft, a driven shaft, planetary gearing including a carrier adapted to drivingly connect the shafts, a brake device for the carrier, a clutch device for locking the gearing for unitary rotation, a pressure fluid system, a valve device in the system responsive to the pressure in the intake manifold for controlling operation of the brake device, a second valve device for controlling operation of said clutch device and the brake device, compound valve means responsive to engine speed and the pressure in the intake manifold and having a fluid passage leading to said second valve device whereby the fluid flowing through said compound valve means and passage means into said second valve device causes engagement of the clutch device and release of the brake device, a solenoid associated with said second valve device, switch means operable at will by the driver for energizing said solenoid to operate said second valve device and overrule said compound valve means, thus effecting release of the clutch device and engagement of the brake device, and means for preventing operation of said first valve device under the control of the pressure in the intake manifold while said compound valve means is overruled.

10. In a transmission for motor vehicles driven by an engine and having a fuel intake manifold, a power shaft, a driven shaft, planetary gearing including a carrier adapted to drivingly connect the shafts, a brake device for the carrier, a clutch device for locking the gearing for unitary rotation, a pressure fluid system, a valve device in the system responsive to the pressure in the intake manifold for controlling operation of the brake device, a second valve device for controlling operation of said clutch device and the brake device, compound valve means responsive to engine speed and the pressure in the intake manifold and having a fluid passage leading to said second valve device whereby the fluid flowing through said compound valve means and passage means into said second valve device causes engagement of the clutch device and release of the brake device, a solenoid associated with said second valve device, switch means operable at will by the driver for energizing said solenoid to operate said second valve device and overrule said compound valve means, thus effecting release of the clutch device and engagement of the brake device, and a conduit leading from said second valve device to said first valve device and opened when said compound valve means is overruled to permit fluid flow through said conduit to said first valve device in order to prevent operation of said first valve device while said compound valve means remains overruled.

11. In a transmission for motor vehicles driven by an engine and having a fuel intake manifold, a power shaft, a driven shaft, planetary gearing including a carrier adapted to drivingly connect the shafts, a brake device for the carrier, a clutch device for locking the gearing for unitary rotation, a pressure fluid system, a valve device in the system responsive to the pressure in the intake manifold for controlling operation of the brake device, a second valve device for controlling operation of said clutch device and the brake device and comprising two valve chambers, a port connecting the two chambers, a valve member in one of said chambers adapted to open and close said port, and a second valve member movable in the other chamber and adapted to connect said clutch device and first-mentioned valve device to fluid flow, compound valve means responsive to engine speed and the pressure in the intake manifold and having a fluid passage connected to the chamber having said first-mentioned valve member whereby the fluid flowing through said compound valve means and passage means into such chamber operates said second valve member to cause engagement of the clutch device and release of the brake device, a solenoid connected to said first-mentioned valve member of said second valve device, switch means operable at will by the driver for energizing said solenoid to cause said first-mentioned valve member to close said port, thus overruling said compound valve means and effecting release of the clutch device and engagement of the brake device, and a conduit leading from the chamber having said first-mentioned valve member to said first valve device, the conduit being opened when the compound valve means is overruled so that fluid passing through the conduit prevents operation of said first valve device under the influence of the pressure in the intake manifold.

12. In a transmission for motor vehicles driven by an engine and having an intake manifold, a power shaft, a driven shaft, planetary gearing including a carrier adapted to drivingly connect the shafts, a brake device for the carrier, a clutch device for locking the gearing for unitary rotation, a pressure fluid system including valve mechanisms for controlling operation of the brake device and clutch device by pressure fluid, the brake device being engaged and the clutch device disengaged when the transmission is in geared drive, means responsive to the vehicle speed and the pressure in the intake manifold for operating the valve mechanisms to disengage the brake device and engage the clutch device upon shift-up from geared drive to direct drive, a solenoid connected with part of said valve mechanisms, a switch in circuit with said solenoid and operable at the will of the driver to cause operation of the solenoid and overrule said speed and pressure responsive means, and a normally closed switch in circuit with said driver operated switch and said solenoid and responsive to vehicle speed so that the normally-closed switch is opened to prevent the overruling of said speed and pressure responsive means upon operation of said driver operated switch while the vehicle is traveling above a certain speed.

13. In a transmission for motor vehicles driven by an engine and having an intake manifold, a power shaft, a driven shaft, planetary gearing including a carrier adapted to drivingly connect the shafts, a brake device for the carrier, a clutch device for locking the gearing for unitary rotation, a pressure fluid system including valve mechanisms for controlling operation of the brake device and clutch device by pressure fluid, the brake device being engaged and the clutch device disengaged when the transmission is in geared drive, means responsive to the vehicle speed and the pressure in the intake manifold for operating the valve mechanisms to disengage the brake device and engage the clutch device upon shift-up from geared drive to direct drive, a solenoid connected with part of said valve mechanisms, a switch in circuit with said solenoid and operable at the will of the driver to cause operation of the solenoid and overrule said speed and pressure responsive means, and a wind switch in said circuit and opened only when the vehicle is traveling above a certain speed.

14. In a transmission for motor vehicles driven by an engine and having an intake manifold, a power shaft, a driven shaft, a planetary gearing including a carrier adapted to drivingly connect the shafts, a brake device for the carrier, a clutch device for locking the gearing for unitary rotation, a pressure fluid system including valve mechanisms for controlling operation of the brake device and clutch device by pressure fluid, the brake device being engaged and the clutch device disengaged when the transmission is in geared drive, means responsive to the vehicle speed and the pressure in the intake manifold for operating the valve mechanisms to disengage the brake device and engage the clutch device upon shift-up from geared drive to direct drive, a solenoid connected with part of said valve mechanisms, a switch in circuit with said solenoid and operable at the will of the driver to cause operation of the solenoid and overrule said speed and pressure responsive means, a normally closed switch in circuit with said driver operated switch and said solenoid and responsive to vehicle speed so that the normally-closed switch is opened to prevent the overruling of said speed and pressure responsive means upon operation of said driver operated switch while the vehicle is traveling above a certain speed, and a second switch operable at the will of the driver and in circuit with said solenoid but out of circuit with said speed responsive switch whereby the driver may overrule said speed and pressure responsive means though the vehicle is traveling above said certain speed.

FOREST R. McFARLAND.

REFERENCES CITED

The following references are of record in the file of this patent:

UNITED STATES PATENTS

| Number | Name | Date |
| --- | --- | --- |
| 1,619,701 | Chorlton | Mar. 1, 1927 |
| 2,062,007 | Lee | Nov. 21, 1936 |
| 2,102,781 | Bieritz | Dec. 21, 1937 |
| 2,137,953 | Rowley | Nov. 22, 1938 |
| 2,184,535 | Sinclair | Dec. 26, 1939 |
| 2,193,305 | Thompson | Mar. 12, 1940 |
| 2,204,672 | Folberth | June 18, 1940 |
| 2,241,677 | Sheldrick | May 13, 1941 |
| 2,298,648 | Russell | Oct. 13, 1942 |
| 2,303,975 | Banker | Dec. 1, 1942 |
| 2,319,388 | Cotterman | May 18, 1943 |
| 2,324,713 | McFarland | July 20, 1943 |
| 2,329,724 | Maurer | Sept. 21, 1943 |
| 2,332,593 | Nutt et al. | Oct. 26, 1943 |
| 2,343,955 | Cotterman | Mar. 14, 1944 |
| 2,381,786 | Tyler | Aug. 7, 1945 |
| 2,402,248 | Hale | June 18, 1946 |
| 2,404,623 | Dodge | July 23, 1946 |
| 2,407,289 | LaBrie | Sept. 10, 1946 |
| 2,418,378 | Voytech | Apr. 1, 1947 |
| 2,456,689 | Eastman | Dec. 21, 1948 |